US009591547B2

(12) United States Patent
Axmon et al.

(10) Patent No.: US 9,591,547 B2
(45) Date of Patent: Mar. 7, 2017

(54) HANDLING OF GAPS IN USE OF A RADIO TRANSCEIVER

(71) Applicant: Telefonaktiebolaget L M Ericsson (publ), Stockholm (SE)

(72) Inventors: Joakim Axmon, Kavlinge (SE); Dandan Hao, Beijing (CN)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 2 days.

(21) Appl. No.: 14/417,047

(22) PCT Filed: Jun. 24, 2014

(86) PCT No.: PCT/CN2014/080590
§ 371 (c)(1),
(2) Date: Jan. 23, 2015

(87) PCT Pub. No.: WO2015/196348
PCT Pub. Date: Dec. 30, 2015

(65) Prior Publication Data
US 2016/0127971 A1    May 5, 2016

(51) Int. Cl.
*H04W 36/30* (2009.01)
*H04W 36/00* (2009.01)
(Continued)

(52) U.S. Cl.
CPC .......... *H04W 36/30* (2013.01); *H04L 1/0033* (2013.01); *H04L 1/203* (2013.01);
(Continued)

(58) Field of Classification Search
CPC H04W 36/30; H04W 36/0044; H04W 72/085
(Continued)

(56) References Cited

U.S. PATENT DOCUMENTS 5,937,016 A * 8/1999 Choi .................... H03M 13/33
                                                            375/341
2010/0190487 A1    7/2010 Wang et al.
(Continued)

FOREIGN PATENT DOCUMENTS

CN    101414893 A    4/2009
CN    103392370 A    11/2013
(Continued)

OTHER PUBLICATIONS

PCT International Search Report, mailed Mar. 23, 2015, in connection with International Application No. PCT/CN2014/080590, all pages.
(Continued)

*Primary Examiner* — Ronald B. Abelson
(74) *Attorney, Agent, or Firm* — Leffler Intellectual Property Law, PLLC

(57) ABSTRACT

A method is disclosed of a wireless communication device comprising a radio transceiver and a first radio access control unit adapted to control operation of the wireless communication device in association with a first network node of a first cellular communication network. The method comprises (during use of the radio transceiver by the first radio access control unit) indicating a worse than actual channel condition to the first network node, monitoring a change in code rate of signals transmitted from the first network node in response to the worse than actual channel condition indication, determining a relation between the worse than actual channel condition indication and the code rate change, and determining an offset value based on the determined relation. The offset value is applicable to offset a channel condition indication value to be transmitted to the first network node in association with a gap in the use of the radio transceiver by the first radio access control unit. Corresponding computer program product, arrangement and wireless communication device are also disclosed, as well as using a server for storing the offset values.

15 Claims, 5 Drawing Sheets

(51) Int. Cl.
*H04W 72/08* (2009.01)
*H04L 1/20* (2006.01)
*H04L 1/00* (2006.01)

(52) U.S. Cl.
CPC ....... *H04W 36/0044* (2013.01); *H04L 1/0003* (2013.01); *H04L 1/0009* (2013.01); *H04W 72/085* (2013.01)

(58) Field of Classification Search
USPC .......................................................... 370/331
See application file for complete search history.

(56) References Cited

U.S. PATENT DOCUMENTS

| | | |
|---|---|---|
| 2011/0317635 A1 | 12/2011 | Swaminathan |
| 2012/0071103 A1 | 3/2012 | Kadous et al. |
| 2013/0310091 A1 | 11/2013 | Tabet et al. |
| 2013/0324145 A1 | 12/2013 | Tabet et al. |
| 2014/0003260 A1 | 1/2014 | Tabet et al. |
| 2014/0369250 A1* | 12/2014 | Ren ....................... H04L 1/0077 370/312 |

FOREIGN PATENT DOCUMENTS

| | | |
|---|---|---|
| WO | 2011075735 A1 | 6/2011 |
| WO | 2013/134557 A2 | 9/2013 |

OTHER PUBLICATIONS

3GPP Technical Specification 36.213, V10.12.0 "Evolved Universal Terrestial Radio Access (E-UTRA); Physical layer procedures (Release 10)" Mar. 2014, pp. 1-127.

Hu, Zhenping et al. "Interference Avoidance for In-Device Coexistence in 3GPP LTE-Advanced: Challenges and Solutions" IEEE Communications Magazine, Nov. 2012, pp. 60-67.

* cited by examiner

HANDLING OF GAPS IN USE OF A RADIO TRANSCEIVER

TECHNICAL FIELD

The present invention relates generally to the field of cellular communication. More particularly, it relates to how to mitigate adverse effects of a gap in the use of a radio transceiver of a wireless communication device operating in connection with a cellular communication network.

BACKGROUND

A typical implementation of a wireless communication device includes a radio transceiver shared by one or more radio access control units (e.g. software stacks) that control operation of the wireless communication device in connection with a respective cellular communication network.

For various reasons, transmission and/or reception gaps may be enforced during the use of the radio transceiver by a radio access control unit, without the network being aware of the gap. For example, if the radio transceiver is shared by two radio access control units, one of the radio access control units may autonomously interrupt the other radio access control unit during use of the radio transceiver (e.g. to perform measurements, listen to paging signals, etc.). Other examples include transmission and/or reception gaps introduced for power saving reasons or because a substantial interference occurs at particular moments in time (e.g. from radar operations of an airport).

During transmission and/or reception gaps, there may be various causes for the network node to increase the robustness of the modulation and coding scheme (MCS) used for downlink transmissions. For example, if a transmission gap occurs, the wireless communication device will not be able to transmit channel condition indication reports (e.g. CQI—channel quality indication—or CSI—channel state information). Alternatively or additionally, the wireless communication device will not be able to transmit HARQ (hybrid automatic repeat request) ACK/NACK (acknowledgement/non-acknowledgement) messages if a transmission gap occurs. Alternatively or additionally, if a reception gap occurs, the wireless communication device will not be able to receive any data, which causes absence of HARQ ACK/NACK. Alternatively or additionally, the wireless communication device will not be able to receive any uplink allocations if a reception gap occurs, which causes absence of uplink data in allocated resources. All of these situations may cause the network to conclude that the channel is bad, and consequently choose a more robust MCS.

However, as soon as the transmission/reception gap is over, the wireless communication device is able to resume communication under the same (or similar) conditions as before the gap. Thus, the more robust MCS may be unnecessarily applied, which causes a decrease in throughput. Since it typically takes some time for the control loop involving channel condition reports from the wireless communicating device and corresponding MCS adjustment to converge, quite a substantial decrease in throughput may be experienced. The decreased throughput may affect the wireless communication device and/or the system as a whole.

The scenario above will be further illustrated below by way of the following examples.

FIG. 1 illustrates a few situations where transmission and/or reception gaps are created autonomously by the wireless communication device.

Part a) illustrates the use 100 of a radio transceiver for UMTS LTE TDD (Universal Mobile Telecommunication Standard, Long Term Evolution, Time Division Duplex), and a corresponding transmission (Tx) blanking 101 (i.e. a transmission gap) during a repetition period 102. Part b) also illustrates the use 110 of a radio transceiver for UMTS LTE TDD, and a corresponding transmission blanking and reception (Rx) puncturing 111 (i.e. a transmission and reception gap) during a repetition period 112.

In part a) and b), the illustrated configuration is UMTS LTE TDD uplink/downlink configuration 1, with Rx puncturing and/or Tx blanking extending over one radio frame.

Part c) illustrates the use 120, 125 of a radio transceiver for uplink (UL) and downlink (DL) UMTS LTE FDD (Frequency Division Duplex), and a corresponding transmission blanking 121 (i.e. a transmission gap) during a repetition period 126. Part d) illustrates the use 130, 135 of a radio transceiver for uplink (UL) and downlink (DL) UMTS LTE FDD, and a corresponding transmission blanking and reception puncturing (i.e. a transmission and reception gap 131) during a repetition period 132.

FIG. 2 illustrates an example with 7 HARQ processes on the downlink (P1, P2, P3, P4, P5, P6, P7 with down-pointing arrows), and corresponding ACK/NACK for LTE TDD uplink/downlink configuration 1 as illustrated by the TDD UL/DL allocation 200. For example, data packets (transport blocks) for DL process P1 is transmitted (or re-transmitted) in sub frame 0 of the first repetition period, and in sub frame 1 of the second repetition period, as indicated by the down-pointing arrows marked with P1. The ACK/NACK of the data packet for DL process P1 transmitted in sub frame 0 of the first repetition period is expected in sub frame 7 of the first repetition period as indicated by the bowed arrow leading from sub frame 0 to sub frame 7. White sub frames indicate downlink reception, dotted sub frames indicate uplink transmission, and striped sub frames indicate special sub frames. If, for example, uplink sub frames 7 and 8 are blanked the network node will not receive any ACK/NACK for the downlink transport blocks of sub frames 0, 1 and 4, even if they may have been successfully received.

As mentioned above, an autonomous gap may cause the network node (e.g. e NodeB—eNB—in UMTS LTE) to assume that the wireless communication device (e.g. user equipment—UE—in UMTS LTE) is experiencing a bad radio channel.

The eNB may assume that the UE has, therefore, failed to decode the downlink control information, which itself is more robust than transmissions on DL-SCH (downlink shared channel).

Alternatively or additionally, the eNB may assume that a previously reported channel quality indication (CQI) is no longer valid. As a consequence, the eNB may back off and assume that the channel quality is lower than indicated by the previously reported CQI.

Alternatively or additionally, the eNB may assume that the particular UE has a bias in its CQI reporting and, for example, reports a more favorable quality than according to the actual channel conditions.

The channel quality indication (CQI) indicates how many information bits can be sent in an allocation of a particular size (e.g. 20 resource block—RB—pairs). At low channel quality (corresponding to low CQI), more error correction encoding and/or a lower order modulation is needed for successful transmission of the information bits, and at high channel quality (corresponding to high CQI), it is possible to use less error correction encoding and/or a higher order modulation and still have successful transmission of the information bits. Hence, the throughput of information bits can be made higher at high CQI than at low CQI, which is illustrated by the example table below (4-bit CQI table of 3GPP TS 36.213 section 7.2.3).

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

When the eNB makes one or more of the assumptions exemplified above due to an autonomous gap it is not aware of, it may choose a more robust MCS (combination of modulation and coding rate), i.e. a MCS corresponding to a lower CQI index, which impacts throughput as exemplified in the efficiency column of the table above.

A few situations where gaps in the use of the radio transceiver by a radio access control unit arise will be described in the following.

Paging

Wireless communication devices (user equipments—UEs) that are idle tune in to the corresponding network node (base station) at predetermined occasions, paging occasions, to check whether they are getting paged by the network. The reason for getting paged may, for instance, be that there is an incoming call for the UE to receive.

While it is in idle mode, the UE is handling the mobility autonomously using neighbor cell information provided by the network. If the current camping cell becomes weak and there is a stronger neighbor cell, the UE will change camping cell to the stronger neighbor. During this—so called—cell reselection, the UE is not monitoring paging and, hence, it may miss if it is getting paged at that moment. To prevent that the paging is missed due to interruption caused by cell reselection, radio access networks are usually repeating the paging one or more times until the UE responds.

All base stations in a so called location (or tracking) area for which the UE has registered are paging the UE. When the UE moves to a cell in another location (or tracking) area, e.g. due to crossing some geographical boundary or changing to another radio access technology, it has to update the network regarding which area it is in via a Location (or Tracking) Area Update procedure. During the time period when the UE is updating the location (or tracking) area, the radio access network will have outdated information regarding the area in which the UE should be paged. To prevent the paging being missed due to outdated location information, the radio access network usually repeats the paging in adjacent location (or tracking) areas if the UE does not respond to paging in the registered location (tracking) area.

Gaps in the use of the radio transceiver by a first radio access control unit may arise if a second radio access control unit needs to listen for pages during a paging occasion.

The paging occasions typically follow a so called paging cycle, which is configured by the radio access network node. The paging cycle length also depends on the radio access technology. Some example idle mode paging cycles include:
GSM—471, 706, 942, 1177, 1412, 1648, 1883, 2118 ms
WCDMA—640, 1280, 2560, 5120 ms
TD-SCDMA—640, 1280, 2560, 5120 ms
LTE—320, 640, 1280, 2560 ms Circuit-Switched Fallback (CSFB)

Circuit switched fallback is an interim solution for supporting voice calls to UEs that are connected to UMTS LTE until VoLTE (voice over LTE, VoIP) and SRVCC (single radio voice call continuity) are supported in the networks.

This feature allows the UE to be paged in the UMTS LTE system for an incoming call in a legacy system (e.g. a GSM system), and it can then be redirected to the legacy RAT (Radio Access Technology, e.g. GSM). This means that a UE can safely camp on, or be connected to, an UMTS LTE cell without missing any incoming calls.

Typically, the UE gets informed about whether CSFB is supported in the UMTS LTE cell when carrying out a combined registration for CS (circuit switched) and PS (packet switched) services. If CSFB is not supported, the registration will fail. The standard-compliant UE action when CS is not supported is to deactivate the support for UMTS LTE.

If CSFB is not supported, gaps in the use of the radio transceiver by a first radio access control unit (e.g. UMTS LTE) may arise if a second radio access control unit (e.g. GSM) needs to listen for pages to allow UMTS LTE camping or connection while (at the same time) camping on a legacy RAT (e.g. GMS) to monitor CS paging.

Single Radio-LTE (SR-LTE)

In SR-LTE a single radio transceiver is shared between UMTS LTE and a legacy RAT (e.g. GSM) in a time-division manner. The UE is connected to or camping on UMTS LTE while (at the same time) it is camping on a legacy RAT. When, for example, monitoring paging in the legacy RAT, reading system information, carrying out mobility measurements, doing a location area update, or receiving a call in relation to the legacy RAT, the radio transceiver is handed over to the legacy RAT and any UMTS LTE activities may be punctured. A device supporting SR-LTE does not rely on CSFB to allow camping on or being connected to UMTS LTE. SR-LTE can be considered a special case of DSDS (dual SIM dual standby) where both SIMs are from the same operator (physically a single SIM).

Gaps in the use of the radio transceiver by a first radio access control unit (e.g. UMTS LTE) may arise if a second radio access control unit (legacy RAT, e.g. GSM) needs to perform any of the tasks exemplified above.

Monitoring Legacy RAT Using Available Additional Receiver

A UE capable of carrier aggregation may use an available receiver otherwise reserved for a secondary component carrier in carrier aggregation to monitor paging, carry out mobility measurements and/or read system information in the legacy RAT. As long as there is large enough separation between UMTS LTE uplink (UL) and legacy RAT downlink (DL) spectrum, the legacy RAT can be received concurrently with UMTS LTE transmissions on the UL. Hence, for this case the legacy RAT can be monitored without any impact on UMTS LTE performance.

Typically, the problems related to gaps (created by a second radio access control unit) in the use of the radio transceiver by a first radio access control unit do not arise in this case.

If the spectral separation between UMTS LTE UL and legacy RAT DL is not sufficient, collisions between UMTS LTE UL transmissions and legacy RAT reception needs to be avoided in order to prevent high energy leaking from the transmitter to the receiver and destroying the signal to be received, or even destroying the LNA (low-noise amplifier) used in the radio transceiver. In many cases, this will mean that UMTS LTE Ul, transmissions need to be skipped when in conflict with legacy RAT activities.

This situation may lead to that the problems related to gaps in the use of the radio transceiver by a first radio access control unit arise.

Dual SIM Dual Standby or Activity

In DSDS (dual SIM dual Standby) and DSDA (dual SIM dual activity) the UE is equipped with two SIM cards, and maintains connectivity (potentially) towards two different networks at the same time (typically for different operators).

For DSDA it is required that the UE uses separate radio transceivers for each connection, since, for example, it may use PS services simultaneously for both SIM identities, or PS service for one SIM and CS service for the other SIM. When one of the connections is terminated but the other still is active, the UE will be in idle mode for the SIM identity associated with the terminated connection. While in idle mode, it will monitor paging and carry out mobility management. For power saving reasons it may be attractive to use only one of the receivers in a time-division manner to maintain connectivity towards a first network and monitor paging in a second network (or for second identity in same network).

Thus, gaps in the use of the radio transceiver by a first (active connection) radio access control unit may arise when a second (idle mode) radio access control unit needs to monitor paging or carry out mobility management.

For DSDS it is not necessary to use two radio transceivers since it is assumed that the UE will be active only towards (at most) one network (or for one SIM identity) at any time, and will only monitor paging and carry out mobility management in the other network. With such a solution, DSDS is essentially similar to SR-LTE in that the radio transceiver is used in a time-division manner with puncturing of the ongoing connection when reading paging from the other network.

Thus, gaps in the use of the radio transceiver by a first radio access control unit (with active connection) may arise if a second radio access control unit (in idle mode) needs to perform any of the tasks exemplified above.

US 2014/0003260 A1 discloses manipulation of modulation and coding scheme (MCS) allocation after a communication interruption. First channel quality information may be generated and transmitted to the base station. A first MCS allocation, which may be based at least in part on the first channel quality information, may be received form the base station. Second channel quality information may be generated and transmitted to the base station, where the second channel quality information is modified by an offset configured to modify a second MCS allocation.

This solution has an inherent delay before an adequate MCS is applied after a communication interruption. Hence a loss of throughput is experienced during the delay. Furthermore, the offset calculation has to be performed every time the method is applied, which is not very resource efficient.

Therefore, there is a need for alternative and improved ways of handling gaps in the use of a radio transceiver.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide alternative and improved ways of handling gaps in the use of a radio transceiver.

According to a first aspect, this is achieved by a method of a wireless communication device comprising a radio transceiver and a first radio access control unit adapted to control operation of the wireless communication device in association with a first network node of a first cellular communication network.

The method comprises (during use of the radio transceiver by the first radio access control unit) indicating a worse than actual channel condition to the first network node, monitoring a change in code rate of signals transmitted from the first network node in response to the worse than actual channel condition indication, determining a relation between the worse than actual channel condition indication and the code rate change, and determining an offset value based on the determined relation.

The offset value is applicable to offset a channel condition indication value to be transmitted to the first network node in association with a gap in the use of the radio transceiver by the first radio access control unit.

According to some embodiments, the wireless communication device may further comprise a second radio access control unit adapted to control operation of the wireless communication device in association with a second network node of a second cellular communication network. The second radio access control unit may be autonomous from the first radio access control unit, and a timing of the gap may be established (e.g. autonomously) by the second radio access control unit.

Indicating the worse than actual channel condition to the first network node may, in some embodiments, comprise at least one of:
  causing an increased error rate estimation of the first network node,
  transmitting a non-acknowledgement message to the first network node when an acknowledgement message would have been transmitted according to the actual channel condition,
  transmitting a worse than actual channel condition indication value to the first network node, and
  temporarily preventing use of the radio transceiver by the first radio access control unit.

In some embodiments, the method may further comprise storing the determined offset value in an offset value database.

In some embodiments, the method may further comprise receiving an offset determination request from a server external to the wireless communication device, wherein the offset determination request triggers the worse than actual channel condition indication to the first network node, and transmitting an offset value determination report to the server, wherein the offset value determination report causes storing of the determined offset value in an offset value database comprised in the server.

According to some embodiments, the method may further comprise detecting an upcoming gap in the use of the radio transceiver by the first radio access control unit, and transmitting the offset channel condition indication value to the first network node in association with the upcoming gap. The offset channel condition indication value may, for example, be transmitted directly before the upcoming gap and/or directly after the upcoming gap.

A second aspect is a computer program product comprising a computer readable medium, having thereon a computer program comprising program instructions. The computer program is loadable into a data-processing unit and adapted to cause execution of the method according to the first aspect when the computer program is run by the data-processing unit.

According to a third aspect, an arrangement is provided for a wireless communication device comprising a radio transceiver and a first radio access control unit adapted to control operation of the wireless communication device in association with a first network node of a first cellular communication network.

The arrangement comprises a controller adapted to (during use of the radio transceiver by the first radio access control unit) cause indication of a worse than actual channel condition to the first network node, monitor a change in code rate of signals transmitted from the first network node in response to the worse than actual channel condition indication, determine a relation between the worse than actual channel condition indication and the code rate change, and determine an offset value based on the determined relation.

The offset value is applicable to offset a channel condition indication value to be transmitted to the first network node in association with a gap in the use of the radio transceiver by the first radio access control unit.

In some embodiments, the controller may comprise a code rate manipulator adapted to cause the worse than actual channel condition indication to the first network node, a code rate monitor adapted to monitor the change in code rate of signals transmitted from the first network node in response to the worse than actual channel condition indication, a relation determiner adapted to determine the relation between the worse than actual channel condition indication and the code rate change, and an offset determiner adapted to determine the offset value based on the determined relation.

The wireless communication device may, according to some embodiments, further comprise a second radio access control unit adapted to control operation of the wireless communication device in association with a second network node of a second cellular communication network. The second radio access control unit may be autonomous from the first radio access control unit, and a timing of the gap may be established (e.g. autonomously) by the second radio access control unit.

The arrangement may further comprise means for storing the determined offset value in an offset value database according to some embodiments.

In some embodiments, the arrangement may further comprise a detector adapted to detect an upcoming gap in the use of the radio transceiver by the first radio access control unit, a CQI calculator adapted to offset the channel condition indication value by the offset value, and a transmitter adapted to transmit the offset channel condition indication value to the first network node in association with the upcoming gap.

A fourth aspect is a wireless communication device comprising the arrangement according to the third aspect.

In some embodiments, the third and fourth aspects may additionally have features identical with or corresponding to any of the various features as explained above for the first aspect.

A fifth aspect is the use of a server comprising an offset value database for storing offset values applicable to offset a channel condition indication value to be transmitted by a wireless communication device to a network node of a cellular communication network in association with a gap in the use of a radio transceiver of the wireless communication device by a radio access control unit of the wireless communication device adapted to control operation of the wireless communication device in association with the network node.

In some embodiments, the use may further comprise transmitting (by a transceiver of the server) an offset determination request to the wireless communication device, receiving (by the transceiver) a corresponding offset value determination report from the wireless communication device, and storing an offset value of the offset value determination report in the offset value database.

An advantage of some embodiments is that throughput (for the system as a whole and/or for the wireless communication device) may be increased. Formulated alternatively, a throughput loss due to gaps in the use of a radio transceiver may be reduced.

Another advantage of some embodiments is that a resource efficient procedure is provided by way of storing a determined offset value for future use (by the wireless communication device and/or by other wireless communication devices).

Yet another advantage of some embodiments is that an accurate offset determination may be achieved by way of statistically combining the result of several offset determinations (possibly from several wireless communication devices).

A further advantage of some embodiments is that the offset value is determined based on the actual behavior (e.g. MCS back off) of the network. Therefore, the risk of using an offset that results in a channel quality indication that corresponds to a better that actual channel condition is very low or non-existent.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where a MCS back off applied by a network node due to a transmission and/or reception gap autonomously created by a wireless communication device is compensated for by the wireless communication device to avoid (or at least minimize) throughput loss due to the gap. The compensation by the wireless communication device comprises application of an offset value to a channel condition indication (e.g. CQI or CSI), wherein the offset value is determined in relation to the applied MCS back off. Some embodiments relate to determination of the offset value by the wireless communication device.

Without being considered as limiting, UE will be used as an example of a wireless communication device and CQI will be used as an example of a channel quality indication in many of the examples herein.

In some typical embodiments, the UE keeps track of the impact an autonomous gap has on the code rate (network back off) and how long the impact lasts, and tunes the CQI report accordingly to compensate for the impact and avoid or minimize throughput loss due to the gap.

This may be achieved by the UE monitoring the code rate used by the network node before and after the autonomous gap, and detecting whether back off occurs, the back off amount and for how long the back off lasts. Once the back off is established, the UE may compensate the back off to more robust encoding in connection to the next (or any subsequent) gap autonomously created by the UE. The compensation typically comprises boosting one or more of the CQI reports during a time interval after the autonomous gap and/or boosting one or more of the CQI reports sent just before the autonomous gap. The term boosting will be understood herein as applying an offset value.

Different back off algorithms may be used throughout a network (e.g. in different geographical areas and/or by different network vendors) and some embodiments may be especially useful for particular scenarios.

Figure 1:
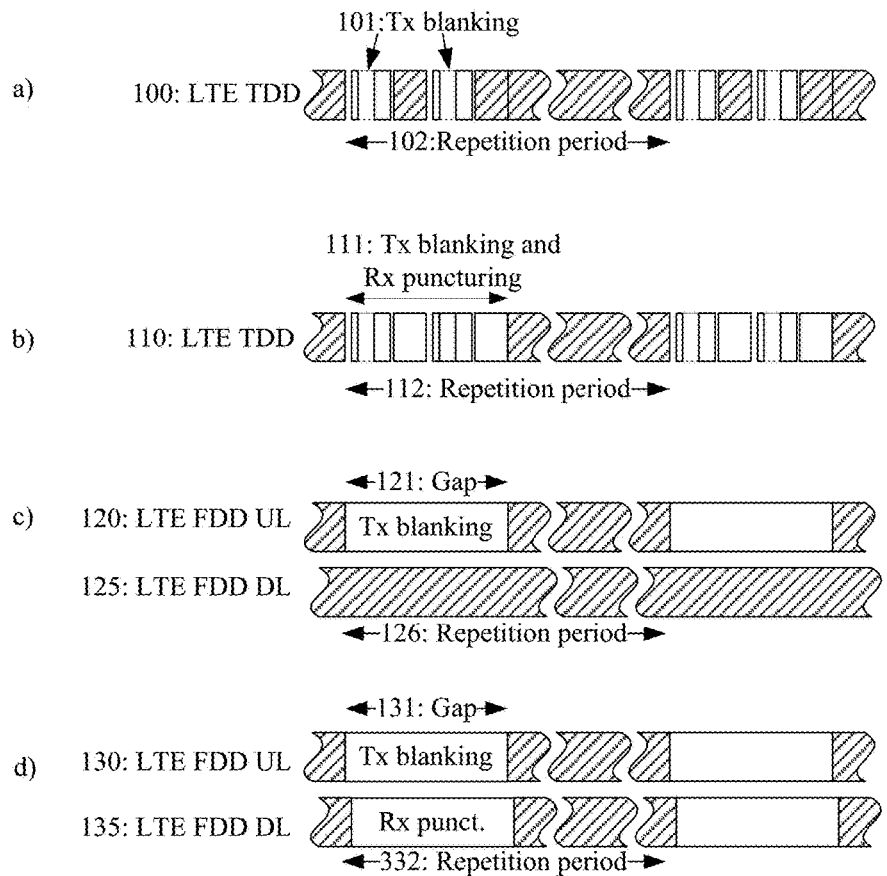
FIG. 1 is a schematic drawing illustrating transmission and/or reception gaps according to some examples.
Figure 2:
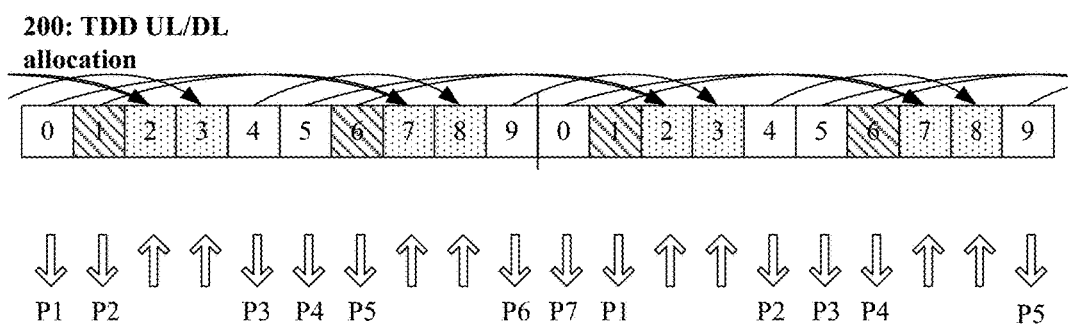
FIG. 2 is a schematic drawing illustrating HARQ transmissions and corresponding ACK/NACK transmissions according to some examples.
Figure 3:
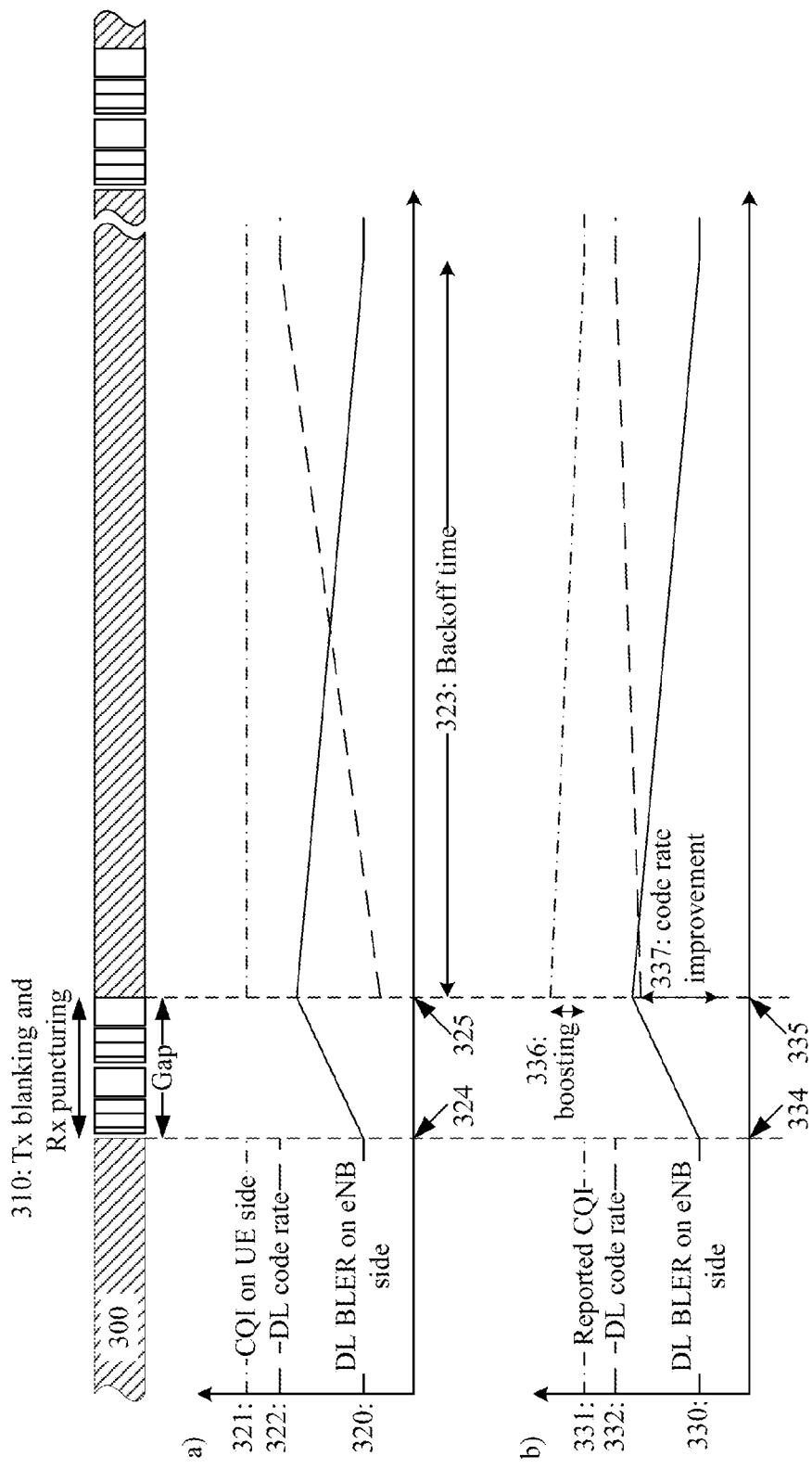
FIG. 3 is a schematic drawing illustrating change of MCS by a network during a transmission and reception gap and a CQI adaptation according to some embodiments.

FIG. 3 illustrates an example of an autonomously created transmission and reception gap (Tx blanking and Rx puncturing) 310 in a use 300 of a radio transceiver (compare with UMTS LTE TDD of FIG. 1). Part a) illustrates operations of the network node and the wireless communication device without application of any of the embodiments and part b) illustrates how some embodiments may be applied to decrease throughput loss due to the gap.

Before the gap, a constant channel quality level is experienced by the wireless communication device and the reported CQI (CQI on UE side) 321, 331 is correspondingly constant. The downlink block error rate as estimated at the network node (DL BLER on eNB side) 320, 330 is also constant before the gap and, accordingly, the MCS used for downlink transmissions (DL code rate) 322, 332 is kept constant.

During the autonomous gap, the network node will experience an increase in downlink block error rate (e.g. due to absence of ACK/NACK or any other reason stemming from the creation of the gap) as illustrated by the slope of line 320 between times 324 and 325 and by the slope of line 330 between times 334 and 335.

The experienced increase in downlink block error rate during the gap typically causes the network node to back off in terms of code rate and/or modulation and fall back to a more robust MCS. This is illustrated in that the line for DL code rate 322 in part a) of FIG. 3 starts from a low level after communication is resumed after the gap at time 325.

In the example of FIG. 3, the channel quality level experienced by the wireless communication device is the same before and after the gap, which is illustrated by the reported CQI (CQI on UE side) 321 being the same before and after the gap in part a) of FIG. 3. When communication is resumed after the gap at time 325 and the network node starts to receive CQI reports (and other communication from the wireless communication device), the network node will eventually converge to the same downlink BLER as experienced before the gap by gradually modifying the MCS, as is illustrated by the slopes of lines 320 and 322 during the back off time 323 in part a) of FIG. 3.

The increased robustness of the MCS and the delay due to convergence causes a loss in throughput as has been elaborated on above. Part b) of FIG. 3 illustrates an approach to mitigate this throughput loss.

In this example, the reported CQI is boosted by an offset 336 just after communication is resumed after the gap at time 335, even though the channel quality level experienced by the wireless communication device is the same before and after the gap. This boosting results in that the network node will use a less robust MCS than in part a) as soon as the boosted CQI is received, as is illustrated by the starting point after communication is resumed after the gap at time 335 of the line for DL code rate 332 in part b) of FIG. 3. The difference 337 between the starting points of lines 322 and 332 after the gap illustrates a code rate improvement, i.e. a difference in robustness, from line 322 to line 332. Thus, the DL coding rate 332 starts from a higher (less robust) level after communication is resumed after the gap at time 335 than the corresponding line 322 of part a), and the throughput loss is (at least partly) mitigated.

Block errors occur due to the gap and increase the short-term DL BLER (which may, typically, be evaluated over the last 200 ms). The number of such errors is the same for parts a) and b) of FIG. 3 since the gap length is the same. Thus, the downlink block error rate as estimated at the network node 320, 330 is the same in part a) and b) in this example.

Figure 4:
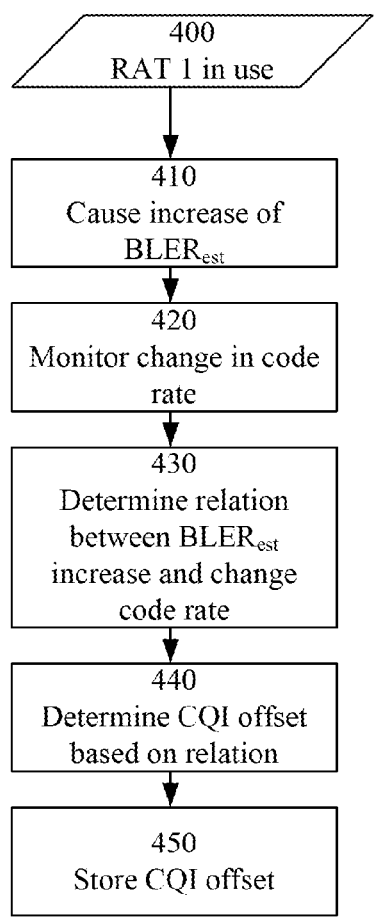
FIG. 4 is a flowchart illustrating example method steps according to some embodiments.

FIG. 4 illustrates an example of a method according to some embodiments. The method may, for example, be performed by a wireless communication device comprising a radio transceiver and a radio access control unit adapted to control operation of the wireless communication device in association with a network node of a cellular communication network. The method may start during use of the radio transceiver by the radio access control unit in accordance with a radio access technology (RAT 1) practiced by the cellular communication network as illustrated by step 400.

As elaborated on above, a gap in the use of the radio transceiver by a first radio access control unit may, for example, be autonomously established by the second radio access control unit comprised in the wireless communication device. The second radio access control unit may be adapted to control operation of the wireless communication device in association with a second network node of a second cellular communication network, and may be autonomous from the first radio access control unit. The second cellular communication network may practise the same or different radio access technology as the cellular communication network associated with the first radio access control unit.

In step 410, the wireless communication device indicates a worse than actual channel condition to the network node.

In the example of FIG. 4, this is achieved by causing an increased block error rate estimation ($BLER_{est}$) of the network node. The increased block error rate estimation may, for example, be caused by transmitting a NACK to the network node when an ACK would have been transmitted according to the actual channel condition (e.g. when a HARQ transmission block has been correctly received) to simulate a gap in the use of the radio transceiver by the radio access control unit. Alternatively or additionally, the increased block error rate estimation may be caused by temporarily preventing the use of the radio transceiver by the radio access control unit (i.e. creating an actual gap).

Alternatively or additionally, the wireless communication device may indicate a worse than actual channel condition to the network node by transmitting a worse than actual channel condition indication value (e.g. a lower CQI).

Then, in step 420, the wireless communication device monitors a change in code rate of signals transmitted from the network node in response to the worse than actual channel condition indication of step 410. The change is typically a decrease in code rate (e.g. a more robust MCS), and the amount of decrease and/or the duration (compare with 323 of FIG. 3) of the decrease may be monitored. Reference herein to code rate may be understood to include one or more of an encoding rate, a modulation format, a MCS, and an amount of allocated resources. In addition to, or as an alternative to, using a more robust MCS as a response to a presumably worsened channel condition, the network node may, for example, allocate fewer resources to the wireless communication device as a response to a presumably worsened channel condition.

In step 430, the wireless communication device determines a relation between the worse than actual channel condition (e.g. $BLER_{est}$) indicated in step 410 and the corresponding change in code rate. Thus, the back off algorithm applied by the network is basically determined (at least partly).

Based on the relation determined in step 430, an offset value is determined in step 440, wherein the offset value is applicable to offset a channel condition indication value (e.g. CQI or CSI) to be transmitted to the network node in association with a gap in the use of the radio transceiver by the radio access control unit. A time window during which the offset value (possibly declining towards zero) is to be applied may also be determined.

Once determined, the offset value (and possibly the time window) may be stored in an offset value database in step 450. The offset value database may, for example, be comprised in the wireless communication device itself, in a network node or in a cloud-based server. In some embodiments, the offset value database may have different entries for different geographical areas (e.g. tracking areas or location areas). There may also be different entries depending on the length of the gap and/or on the channel condition indication value corresponding to the actual channel conditions.

When the offset value database is comprised in a server external to the wireless communication device, the method of FIG. 4 (i.e. execution of step 410) may be triggered by receiving an offset determination request from the server, and step 450 may comprise transmitting an offset value determination report to the server, which causes storing of the determined offset value in the offset value database.

By application of this variant of the method, the server may request offset value determination according to the method of FIG. 4 from a number of selected wireless communication devices. The results may be used as a statistical basis for the offset values of the database entries. Thus, according to some embodiments, offset value determination does not have to be performed by all wireless communication devices.

Figure 5:
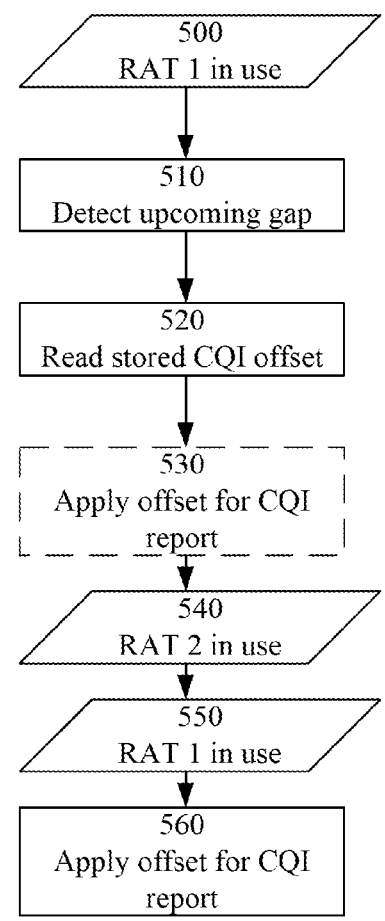
FIG. 5 is a flowchart illustrating example method steps according to some embodiments.

FIG. 5 illustrates an example of a method according to some embodiments. The method may, for example, be performed by a wireless communication device comprising a radio transceiver and a radio access control unit adapted to control operation of the wireless communication device in association with a network node of a cellular communication network. It may be the same or different wireless communication device as the one of FIG. 4. In FIG. 5, it is assumed that a gap in the use of the radio transceiver by a first radio access control unit (associated with a first radio access technology, RAT 1) is autonomously established by a second radio access control unit (associated with a first radio access technology, RAT 2) comprised in the wireless communication device. The gap is illustrated in step 540 and corresponds to the time that RAT 2 is in use and the end of the gap is indicated by step 550 when RAT 1 is used again.

It should be noted that other scenarios of gap establishment (e.g. by negotiation between the first and second radio access control units) may be applicable according to various embodiments.

The method may start during use of the radio transceiver by the first radio access control unit as illustrated by step 500.

An upcoming gap is detected in the use of the radio transceiver by the first radio access control unit in step 510, and in step 520 a stored offset value, applicable to channel condition indications (e.g. CQI or CSI) in connection with a gap, is read from an offset value database. The offset value database may, for example, be comprised in the wireless communication device itself, in a network node or in a cloud-based server.

The offset value may be applied to a channel condition indication transmitted directly before the upcoming gap as illustrated by step 530. Alternatively or additionally, the offset value may be applied to a channel condition indication transmitted directly after the upcoming gap as illustrated by step 560. Alternatively or additionally, the offset value (possibly successively lowered) may be applied to several channel condition indications transmitted after the upcoming gap, for example, during a back off period associated with the offset value.

Generally, it should be noted that the offset value may be static (a single value) or dynamically adjustable.

Figure 6:
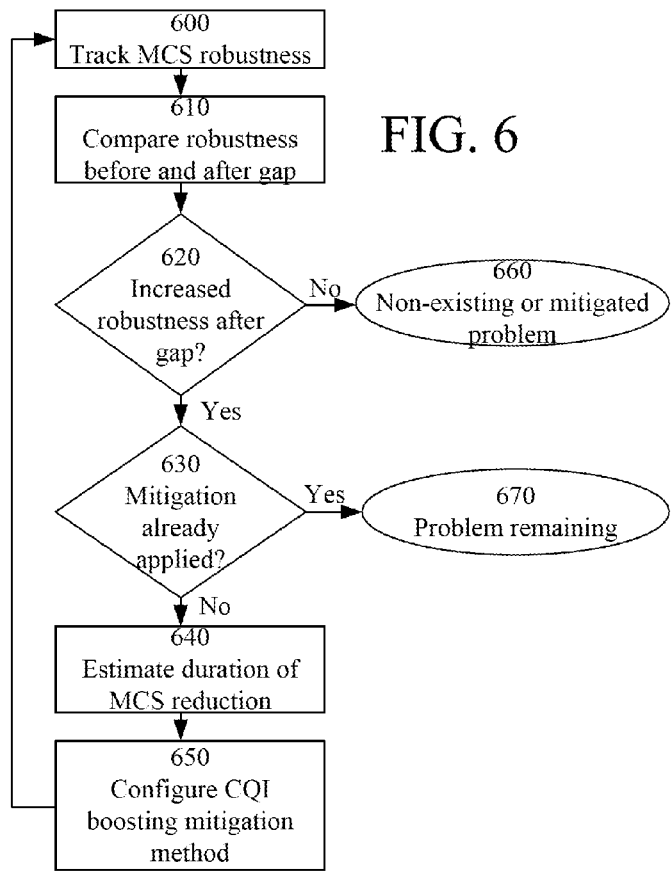
FIG. 6 is a flowchart illustrating example method steps according to some embodiments.

FIG. 6 illustrates an example of a method according to some embodiments. This method is particularly suitable when offset determination is made "on the fly" during actual transmission/reception gaps and an offset determined (or adjusted) during one gap may be applied to subsequent gaps. The method may, for example, be performed by a UE operating in connection with a UMTS LTE network.

The method starts in step 600 where the UE tracks the code rate (e.g. MCS) of the PDSCH (physical downlink shared channel) for transmissions associated with the C-RNTI (cell radio network temporary identity) of the cell it is currently associated with.

When an autonomous gap occurs, the UE compares the code rate robustness before and after the gap in step 610.

If the code rate robustness has not increased during the gap (No-path out from step 620), the UE may deduce that either there is no problem with back off in this location and for this network or any problem is already mitigated (e.g. by an already applied CQI offset determined at an earlier point in time and/or by one or more other suitable methods) as illustrated by 660 in FIG. 6. The conclusion in 660 may be made at once or after performing steps 600-620 for several gaps.

If the code rate robustness has increased during the gap (Yes-path out from step 620) and if mitigation (CQI offset and/or one or more other suitable methods) has already been correctly applied (Yes-path out from step 630), the UE may deduce that the problem is remaining as illustrated by 670 in FIG. 6. If so, the UE may additionally try to use other means to try to mitigate the back off (e.g. avoiding the creation of autonomous gaps when CQI reports are to be sent to the network and/or when sounding reference signals are to be transmitted) and/or may apply autonomous gaps less frequently (e.g. to limit any impact on PDCCH BLER which typically has a stricter BLER target than PDSCH).

Avoiding the creation of autonomous gaps in certain time windows may, for example, be accomplished by using priorities associated with requests for using the radio transceiver (where e.g. the request with highest priority gets to use the radio transceiver and CQI reporting is booked with higher priority than other radio activities) and/or by not monitoring some paging occasions (e.g. every second paging occasion).

If the code rate robustness has increased during the gap (Yes-path out from step 620) and if mitigation (CQI offset and/or one or more other suitable methods) has not already been applied—at least not with an appropriate offset value, e.g. according to a latest offset value determination—(No-path out from step 630), the UE estimates the duration of the back off (e.g. MCS reduction) after the gap in step 640 (compare with 323 of FIG. 3) and configures the CQI boosting mitigation method to be applied during (at least part of) the estimated duration in step 650.

Various steps of the methods described in connection with FIGS. 4, 5 and 6 may be combined in any suitable manner.

Figure 7:
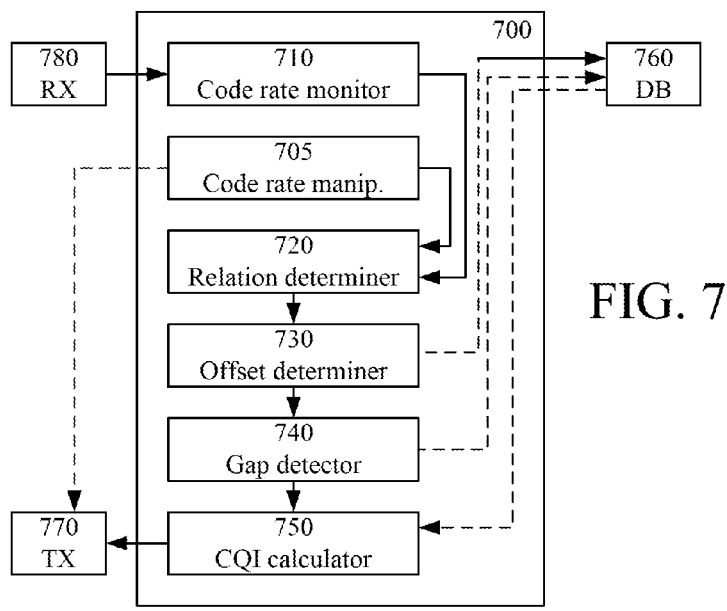
FIG. 7 is a block diagram illustrating an example arrangement according to some embodiments.

FIG. 7 illustrate an arrangement for a wireless communication device. The arrangement may, for example, be adapted to perform any of the methods described in connection with FIGS. 4, 5, and 6.

A wireless communication device comprising the arrangement has a radio transceiver, illustrated in FIG. 7 as a receiver (RX) 780 and a transmitter (TX) 770, and at least a first radio access control unit adapted to control operation of the wireless communication device in association with a first network node of a first cellular communication network.

The arrangement comprises a controller 700, which may be comprised in the first radio access control unit. The controller 700 is adapted to, during use of the radio transceiver by the first radio access control unit cause indication of a worse than actual channel condition to the first network node (e.g. by way of a code rate manipulator 705, compare with step 410 of FIG. 4), monitor a change in code rate of signals transmitted from the first network node in response to the worse than actual channel condition indication (e.g. by way of a code rate monitor 710, compare with step 420 of FIG. 4), determine a relation between the worse than actual channel condition indication and the code rate change (e.g. by way of a relation determiner 720, compare with step 430 of FIG. 4), and determine an offset value based on the determined relation (e.g. by way of an offset determiner 730, compare with step 440 of FIG. 4).

The offset value is applicable to offset a channel condition indication value to be transmitted to the first network node in association with a gap in the use of the radio transceiver by the first radio access control unit. To this end, the controller 700 may further comprise a gap detector 740 adapted to detect an upcoming gap in the use of the radio transceiver by the first radio access control unit (compare with step 510 of FIG. 5) and a CQI calculator 750 adapted to offset the channel condition indication value by the offset value before transmission of the offset channel condition indication value to the first network node in association with the upcoming gap (compare with steps 530 and 560 of FIG. 5).

In some embodiments, the arrangement also comprises means for storing the determined offset value in an offset value database (DB) 760 (compare with step 450 of FIG. 4). The offset value database 760 may be comprised in the wireless communication device (and may even be comprised in the arrangement), or it may be located in a network node or a cloud-based server, for example.

In embodiments, where the determined offset value is stored in an offset value database, the gap detector 740 may be adapted to cause reading of a stored offset value (compare with step 540 of FIG. 5), which offset value is then used by the CQI calculator 750.

The offset value database may have different entries for different geographical locations, different network providers, different (not yet offset) CQI values and/or different gap lengths, for example.

Storing a determined offset value in the offset value database may comprise storing the actual determined offset value or use the determined offset value as part of a statistical basis for determine the offset value for an entry of the database.

An entry may, for example, be determined as a (weighted) average of several determined offset values (possibly from different wireless communication devices). Alternatively or additionally, an entry may, for example, be determined as by filtering several determined offset values (possibly from different wireless communication devices).

An entry of the offset value database may be time stamped, and old values may be considered less reliable than new values.

A server comprising the offset value database may be adapted to transmit an offset determination request to one or more wireless communication devices and receive corresponding offset value determination reports from the wireless communication devices for storing in the offset value database. Thereby, the server is provided with the possibility to order offset value determinations from one or more wireless communication devices, as suitable (e.g. when an entry comprises a less reliable value).

Hence, it is not necessary for all wireless communication devices to perform offset value determinations, which increases overall efficiency.

Figure 8:
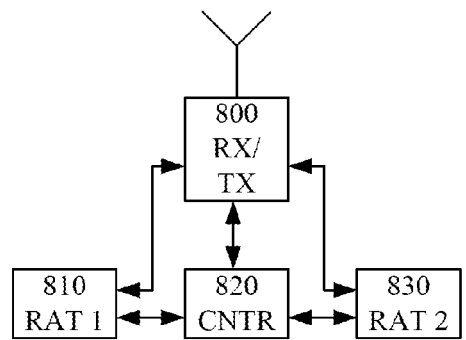
FIG. 8 is a block diagram illustrating an example arrangement according to some embodiments.

FIG. 8 schematically illustrate an architecture of a wireless communication device, where some embodiments, may be applicable. The architecture comprises a radio transceiver (RX/TX) 800 shared between a first radio access control unit (RAT 1) 810 and a second radio access control unit (RAT 2) 830. A radio transceiver control unit (CNTR) 820 may be adapted to control the sharing of the radio transceiver 800.

A gap in the use of the radio transceiver 800 by the first radio access control unit 810 may be autonomously established by the second radio access control unit 830, as has been elaborated on above, and the first radio access control unit 810 may apply embodiments to mitigate adverse effects of the gap as suitable.

Figure 9:
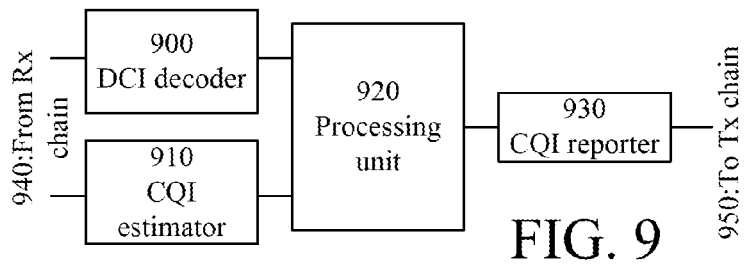
FIG. 9 is a block diagram illustrating an example arrangement according to some embodiments.

FIG. 9 schematically illustrates an arrangement of a wireless communication device according to some embodiments, and will be described in terms of UMTS LTE. A downlink control information (DCI) decoder 900 and a CQI estimator 910 receive signals from an Rx chain as illustrated by 940.

The DCI decoder 900 decodes downlink control information (e.g. MCS information) carried on PDCCH of the signals 940. The CQI estimator 910 estimates the channel quality on OFDM symbols in the control region, where PDCCH is sent, and accordingly determines a CQI in accordance with actual channel conditions.

The DCI decoder 900 and the CQI estimator 910 transfer their finding to a processing unit 920, which calculates the code rate of transport blocks associated with the C-RNTI based on the MCS and allocations provided in the DCI. The processing unit 920 also keeps track of when autonomous gaps appear. The processing unit 920 provides the estimated CQI and any potential boosting (offset value) to be applied in connection with a gap to a CQI reporter 930, which prepares the CQI report for transmission on the uplink and transfers the CQI report to a transmission (Tx) chain as illustrated by 950.

In some embodiments, the processing unit 920 may also monitor the CQI estimates provided by the CQI estimator 910 over time to detect whether channel conditions have changed, and adapt its instruction to the CQI reporter accordingly.

Other inputs (not illustrated) of the processing unit 920 may include, for example, calculated BLER for the transport blocks associated with C-RNTI.

One or more of the blocks of FIG. 9 may be comprised in the controller 700 described in connection with FIG. 7.

A few illustrative examples will now be given to further illustrate operation according to various embodiments.

UE Monitoring DCI to Assess Whether Back Off Occurs

The UE monitors the code rate used for transport blocks received on PDSCH for the applicable C-RNTI (Cell Radio network temporary identity) and compares the code rate used before an autonomous gap with the code rate used after the autonomous gap to detect whether the eNodeB has applied back off (e.g. due to assuming that the UE is experiencing worse radio propagation conditions).

The code rate information can be retrieved from the DCI on PDCCH following the procedure in 3GPP TS 36.213 v10.12.0, section 7.1.7, and particularly using the transmitted parameter IMCS to determine the modulation block size index ITBS which is further used in look-up tables (see e.g. Tables 7.1.7.2.1-1, 7.1.7.2.2-1, 7.1.7.2.4-1 and 7.1.7.2.5-1 of 3GPP TS 36.213 v10.12.0) depending on allocation size and the number of mapped layers, to find the transport block size. The total number of transmitted bits may be calculated by considering all resource elements over the allocated bandwidth not reserved for reference signals, synchronization signals, or the physical broadcast channel, and taking the modulation order into account (QPSK: 2 bits, 16QAM: 4 bits, and 64QAM: 6 bits per resource element). The modulation index, $Q_m$, is given by the transmitted IMCS. The code rate may be derived by the UE as the transport block size divided by the total number of transmitted bits. The actual allocation to the UE may be different in different sub frames. Hence, the code rate may fluctuate slightly over the received transport blocks. To suppress the fluctuations the code rate for the most recently received transport blocks may be subjected to filtering, e.g. a median filter over say a sliding window over 20 transport blocks.

Thus, the UE may compare the filtered code rate before and after the autonomous gap, to detect whether the transmissions after the autonomous gap are more robust (lower code rate and/or lower ITBS) than immediately before the gap.

An alternative to calculating the code rate as explained above is to use a combination of ITBS and $Q_m$ directly as an approximation for the code rate, thus reducing the need to use look-up tables and to calculate the total number of bits.

If the UE determines that there is a significant change in code rate after the gap as compared to before the gap (e.g. a reduction by 10% or more) the UE may consider that the autonomous gap has caused back off by the eNB. The threshold used to compare the code rate difference with in the determination may be a static threshold, or may be a variable threshold that depends, for example, on the modulation and coding scheme used immediately before the autonomous gap.

According to some embodiments, the UE continues to monitor the code rate for some duration (e.g. 200 ms) after the autonomous gap to determine (at least approximately) how many sub frames it takes before the back off has been removed (i.e. the control loop has converged).

The UE may repeat the above-described detection multiple times (e.g. over multiple autonomous gaps) to improve the detection performance.

UE Monitors DL BLER to Assess Whether Back Off Occurs

The UE monitors the block error rate for transport blocks received on PDSCH for the applicable C-RNTI, and estimates the BLER before and after an autonomous gap. If the BLER is reduced immediately after the gap, the UE may consider that the autonomous gap has caused back off by the eNB.

If the autonomous gap is partial (e.g. only blanking of Tx), the UE can still receive when it is getting scheduled during the gap, although it cannot send ACK/NACK or otherwise transmit on the uplink. Hence, in such scenarios, the UE knows whether it got scheduled and can calculate the DL BLER seen by the eNB (where BLER depends on the combined effect of radio conditions and the autonomous gap) even during the gap.

UE Tunes CQI Report to Compensate for Back Off

A UE that has detected that the autonomous gaps leads to back off (and how long the back off period is) can boost the CQI report to (at least partly) compensate for the throughput loss that arises when the eNB sends data more robustly encoded than called for by the radio propagation conditions.

The boosting can be fixed (e.g. increase the CQI index by one step) or variable (e.g. depending on how much loss in code rate has been detected). When variable boosting is applied a lookup-table may be used to see which offset value (boosting) should be applied. The look-up table may, for example, have one column per code rate before the gap, one row per code rate after the gap (i.e. after back off), and the elements expressing how much to boost (offset) the reported CQI. Alternatively or additionally, variable boosting may be expressed by a mathematical function.

The boosting may be applied for the CQI reporting occasions following immediately after the autonomous gap. Alternatively or additionally, the boosting may be applied already for a CQI reporting occasion occurring immediately before the autonomous gap (e.g. if such an occasion falls within the 10 sub frames preceding the autonomous gap). In some embodiments, the boosting may continue until the last CQI reporting occasion falling within the duration (time period) for which back off has been detected. The boosting may also be stopped earlier if it is determined that the achieved code rate has reached the one used immediately before the gap.

UE Dynamically Tunes the CQI Report to Compensate for Back Off

In addition to using the principles above, the UE assesses how the code rate differs compared to the code rate immediately before the gap for each CQI reporting occasion within the detected duration for the back off, and gradually reduces the boosting until it is completely reduced or until the duration has ended. The UE may reduce the original boosting by step-wise decrementing the initial boosting, or it may reduce the original boosting by using the lookup-table detailed above to get a new suitable boosting value before each CQI reporting occasion.

UE Monitoring CQI to Track Changes in Channel Conditions

In addition to using the principles above, the UE tracks the derived CQI (excluding the boosting) to detect whether channel conditions change. The UE assesses whether the CQI is fluctuating, and—if so—it assesses what hypothetical impact the fluctuation has on the code rate. Then, the UE uses the assessments to change the target code rate for the boosting. Thus, according to this example, the code rate before the autonomous gap is no longer considered a static target if the channel conditions change. Instead, the code rate target is modified depending on the varying channel conditions, using the code rate immediately before the autonomous gap as a starting point.

UE Storing and/or Sharing Information on Back Off and Mitigation Scheme

In addition to using the principles above, the UE may store determined information regarding detected back off (e.g. whether back off is applied, how large it is, and/or its duration after a gap) either locally—as history information—or shared with some node in the network and/or with a server in a cloud. If the information is stored in a network node or a server, it can later be retrieved by the UE or another UE (e.g. when entering the applicable tracking area). The stored information may, for example, include one or more of the following parameters:

PLMN (public land mobile network)
Tracking area
Carrier frequency
Physical cell identity
Whether or not back off is applied
Mitigation scheme (e.g. whether methods according to some embodiments have been successfully applied, whether other methods have been successfully applied, whether no successful mitigation has been found)

Offset Value Determination Based on Code Rate Response to Worse than Actual Channel Condition Indication In this example, the UE measures CQI and finds that, when the estimated CQI is fluctuating within a particular range (e.g. CQI 11 to 13) under stable DL BLER and UL BLER as observed from UE side, the code rate is in the range of 0.55 to 0.75 according to the following table (which corresponds to part of the table disclosed above with the code rate expressed in as decimal numbers).

| CQI index | MCS | Code rate |
|---|---|---|
| ... | ... | ... |
| 10 | 19 | 0.46 |
| 11 | 21 | 0.55 |
| 12 | 23 | 0.65 |
| 13 | 26 | 0.75 |
| 14 | 27 | 0.85 |
| 15 | 28 | 0.92 |

When BLER increases due to the worse than actual channel condition indication (e.g. in the form of deliberately sending NACK after successful decoding of a number of consecutive (or otherwise close to each other in time) transport blocks or in the form of an actual autonomous gap of a particular length), the UE may find that the CQI still is in the range CQI 11 to 13, but the code rate has been decreased (e.g. by about 0.1, thus being in the range 0.46 to 0.65).

Based on the number of induced block errors in excess of those that are due to the radio propagation, the UE may determine that—for a particular gap length—the back off in the base station due to link adaptation will correspond to a drop of 0.1 in code rate (equivalent to one CQI step within this particular CQI range). Hence, when measuring CQI 11 (which corresponds to 0.46 in code rate due to the link adaptation) the UE may apply boosting corresponding to one CQI step and send CQI 12 (which may result in the UE getting a code rate of 0.55, in correlation with the measured CQI 11).

Thus, when the UE introduces autonomous gaps, it will be able to know what impact they have on the link adaptation and can compensate by boosting the CQI before reporting.

In various embodiments, the boosting may be a function of the residual between a previously identified code rate without additional block errors, and a short-term filtered code rate. The boosting may, for example, be gradually reduced and stopped when either the residual is smaller than some threshold, or some maximum time has elapsed—whichever comes first.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a user equipment, a portable or handheld mobile radio communication equipment, a mobile radio terminal, a mobile telephone, a communicator, an electronic organizer, a smartphone, a computer, a notebook, or a mobile gaming device.

Figure 10:
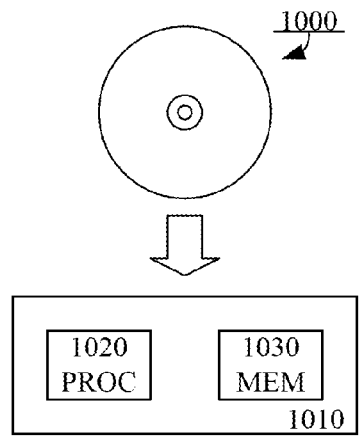
FIG. 10 is a schematic drawing illustrating an example computer program product arrangement according to some embodiments.

According to some embodiments, a computer program product comprises a computer readable medium such as, for example, a diskette, a USB-stick, a plug-in card, an embedded drive or a CD-ROM as illustrated by 1000 of FIG. 10. The computer readable medium 1000 may have stored thereon a computer program comprising program instructions. The computer program may be loadable into a data-processing unit (PROC) 1020, which may, for example, be comprised in a wireless communication device 1010. When loaded into the data-processing unit 1020, the computer program may be stored in a memory (MEM) 1030 associated with or integral to the data-processing unit 1020. According to some embodiments, the computer program may, when loaded into and run by the data-processing unit, cause the data-processing unit to execute method steps according to, for example, the methods shown in any of the FIGS. 4, 5 and 6.

Reference has been made herein to various embodiments. However, a person skilled in the art would recognize numerous variations to the described embodiments that would still fall within the scope of the claims. For example, the method embodiments described herein describes example methods through method steps being performed in a certain order.

However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of a wireless communication device comprising a radio transceiver and a first radio access control unit adapted to control operation of the wireless communication device in association with a first network node of a first cellular communication network, the method comprising, during use of the radio transceiver by the first radio access control unit:
   indicating a worse than actual channel condition to the first network node;
   monitoring a change in code rate of signals transmitted from the first network node in response to the worse than actual channel condition indication;
   determining a relation between the worse than actual channel condition indication and the code rate change; and
   determining an offset value based on the determined relation, wherein the offset value is applicable to offset a channel condition indication value to be transmitted to the first network node in association with a gap in the use of the radio transceiver by the first radio access control unit.

2. The method of claim 1 wherein the wireless communication device further comprises a second radio access control unit adapted to control operation of the wireless communication device in association with a second network node of a second cellular communication network, the second radio access control unit being autonomous from the first radio access control unit, and wherein a timing of the gap is established by the second radio access control unit.

3. The method of claim 1, wherein indicating the worse than actual channel condition to the first network node comprises at least one of:
   causing an increased error rate estimation of the first network node;
   transmitting a non-acknowledgement message to the first network node when an acknowledgement message would have been transmitted according to the actual channel condition;
   transmitting a worse than actual channel condition indication value to the first network node; and
   temporarily preventing use of the radio transceiver by the first radio access control unit.

4. The method of claim 1, further comprising storing the determined offset value in an offset value database.

5. The method of claim 1, further comprising:
   receiving an offset determination request from a server external to the wireless communication device, wherein the offset determination request triggers the worse than actual channel condition indication to the first network node; and
   transmitting an offset value determination report to the server, wherein the offset value determination report causes storing of the determined offset value in an offset value database comprised in the server.

6. The method of claim 1, further comprising:
   detecting an upcoming gap in the use of the radio transceiver by the first radio access control unit; and
   transmitting the offset channel condition indication value to the first network node in association with the upcoming gap.

7. The method of claim 6, wherein the offset channel condition indication value is transmitted directly before the upcoming gap.

8. The method of claim 6, wherein the offset channel condition indication value is transmitted directly after the upcoming gap.

9. A nontransitory computer readable medium, having thereon a computer program comprising program instructions, the computer program being loadable into a data-processing unit and adapted to cause execution of a method when the computer program is run by the data-processing unit, wherein the method is of a wireless communication device comprising a radio transceiver and a first radio access control unit adapted to control operation of the wireless communication device in association with a first network node of a first cellular communication network, the method comprising, during use of the radio transceiver by the first radio access control unit:
   indicating a worse than actual channel condition to the first network node;
   monitoring a change in code rate of signals transmitted from the first network node in response to the worse than actual channel condition indication;
   determining a relation between the worse than actual channel condition indication and the code rate change; and
   determining an offset value based on the determined relation, wherein the offset value is applicable to offset a channel condition indication value to be transmitted to the first network node in association with a gap in the use of the radio transceiver by the first radio access control unit.

10. An arrangement for a wireless communication device comprising a radio transceiver and a first radio access control unit adapted to control operation of the wireless communication device in association with a first network node of a first cellular communication network, the arrangement comprising a controller adapted to, during use of the radio transceiver by the first radio access control unit:
   cause indication of a worse than actual channel condition to the first network node;
   monitor a change in code rate of signals transmitted from the first network node in response to the worse than actual channel condition indication;
   determine a relation between the worse than actual channel condition indication and the code rate change; and
   determine an offset value based on the determined relation, wherein the offset value is applicable to offset a channel condition indication value to be transmitted to the first network node in association with a gap in the use of the radio transceiver by the first radio access control unit.

11. The arrangement of claim 10 wherein the controller comprises:

a code rate manipulator adapted to cause the worse than actual channel condition indication to the first network node;
a code rate monitor adapted to monitor the change in code rate of signals transmitted from the first network node in response to the worse than actual channel condition indication;
a relation determiner adapted to determine the relation between the worse than actual channel condition indication and the code rate change; and
an offset determiner adapted to determine the offset value based on the determined relation.

12. The arrangement of claim 10 wherein the wireless communication device further comprises a second radio access control unit adapted to control operation of the wireless communication device in association with a second network node of a second cellular communication network, the second radio access control unit being autonomous from the first radio access control unit, and wherein a timing of the gap is established by the second radio access control unit.

13. The arrangement of claim 10 further comprising storage for storing the determined offset value in an offset value database.

14. The arrangement of claim 10 further comprising:
a detector adapted to detect an upcoming gap in the use of the radio transceiver by the first radio access control unit;
a CQI calculator adapted to offset the channel condition indication value by the offset value; and
a transmitter adapted to transmit the offset channel condition indication value to the first network node in association with the upcoming gap.

15. A wireless communication device comprising the arrangement according to claim 10.

* * * * *

UNITED STATES PATENT AND TRADEMARK OFFICE
CERTIFICATE OF CORRECTION

PATENT NO.        : 9,591,547 B2
APPLICATION NO.   : 14/417047
DATED             : March 7, 2017
INVENTOR(S)       : Axmon et al.

Page 1 of 1

It is certified that error appears in the above-identified patent and that said Letters Patent is hereby corrected as shown below:

On the Title Page

On Page 2, in Item (56), under "U.S. PATENT DOCUMENTS", in Column 2, Line 3, delete "Ren" and insert -- Ren et al. --, therefor.

On Page 2, in Item (56), under "OTHER PUBLICATIONS", in Column 2, Line 3, delete "1-127." and insert -- 1-129. --, therefor.

In the Drawings

In Fig. 1, Sheet 1 of 5, delete Tag "332" and insert Tag -- 132 --, therefor.

In the Specification

In Column 2, Line 3, delete "Standard," and insert -- Service, --, therefor.

In Column 4, Line 30, delete "GMS)" and insert -- GSM) --, therefor.

In Column 5, Line 6, delete "UI," and insert -- UL --, therefor.

In Column 5, Line 50, delete "received form" and insert -- received from --, therefor.

In Column 10, Line 48, delete "practiced" and insert -- practised --, therefor.

In Column 12, Line 12, delete "first" and insert -- second --, therefor.

In Column 14, Line 50, delete "control" and insert -- technology --, therefor.

In Column 14, Line 51, delete "control" and insert -- technology --, therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*